United States Patent [19]

Komatsu et al.

[11] Patent Number: 4,636,954

[45] Date of Patent: Jan. 13, 1987

[54] X-RAY DIAGNOSTIC APPARATUS COMPRISING X-RAY INTENSITY AND DIAPHRAGM VALUE CONTROLS

[75] Inventors: Kenichi Komatsu, Ootawara; Senzo Fujii, Tochigi, both of Japan

[73] Assignee: Tokyo Shibaura Denki Kabushiki Kaisha, Kawasaki, Japan

[21] Appl. No.: 565,225

[22] Filed: Dec. 23, 1983

[30] Foreign Application Priority Data

Dec. 27, 1982 [JP] Japan ................... 57-226975

[51] Int. Cl.$^4$ ............................................. H04N 5/32
[52] U.S. Cl. ................................. 364/414; 378/901; 378/99; 358/111
[58] Field of Search ................... 364/414; 378/901, 4, 378/16, 98, 99, 146, 148; 358/111

[56] References Cited

U.S. PATENT DOCUMENTS

| | | | |
|---|---|---|---|
| 4,350,941 | 9/1982 | McClure et al. | 364/474 |
| 4,359,759 | 11/1982 | McBride et al. | 378/99 |
| 4,394,738 | 7/1983 | Wagner | 378/4 X |
| 4,432,014 | 2/1984 | Roos et al. | 358/111 |
| 4,473,843 | 9/1984 | Bishop et al. | 358/111 |

*Primary Examiner*—Jerry Smith
*Assistant Examiner*—Charles B. Meyer
*Attorney, Agent, or Firm*—Finnegan, Henderson, Farabow, Garrett & Dunner

[57] ABSTRACT

An X-ray diagnostic apparatus comprising an X-ray source for irradiating X rays to a patient, an image intensifier tube for converting an X-ray image, formed by transmitting X rays through the patient to an optical image, a television camera for receiving the optical image from the image intensifier tube through a diaphragm to output the video signal. In this pick-up apparatus, the X-ray source pre-irradiates one time a small dose of X-rays before main irradiation and there are provided a detector for detecting the maximum value of the video signal produced from the camera at the time of pre-irradiation, and an arithmetic operation circuit for calculating a diaphragm value from the maximum value detected and from pick-up conditions except a diaphragm value at the time of main irradiation of X rays in such a way that the maximum value of the video signal from the camera at the time of main irradiation becomes equal to the maximum permissible value of the camera.

5 Claims, 3 Drawing Figures

X-RAY DIAGNOSTIC APPARATUS COMPRISING X-RAY INTENSITY AND DIAPHRAGM VALUE CONTROLS

BACKGROUND OF THE INVENTION

The present invention relates to an X-ray diagnostic apparatus capable of converting an X-ray image formed by radiating X rays through a patient, into a video signal.

One type of diagnostic apparatus is an X-ray diagnostic apparatus wherein an X-ray image formed by irradiating X rays through a patient to be diagnosed is converted to an optical image by an image intensifier tube and wherein the optical image is then converted to a video signal by a television camera. The image pick-up quality of this apparatus depends on the amount of X-rays irradiated, conversion characteristic of the image intensifier tube, diaphragm of the television camera and so on. Conventionally, the optimum pick-up quality is determined by adjusting the amount of X rays irradiated. More specifically, pre-irradiation of X rays is repeated several times while increasing the amount of X rays. When the average value of the video signal output from the television camera reaches a value which is in the center of the dynamic range of the video signal of the camera, image pick-up conditions are regarded at this instant as being optimum, and an image forming substance is then injected into the blood stream of the patient, and main irradiation of X rays is carried out under this optimum condition to obtain a video signal which represents the image of the patient.

Image pick-up conditions determined by this process, however, may not always be optimum. The dynamic range of the television camera is narrow relative to incident light, and when the intensity of incident light becomes larger than a certain value, a current value of the output signal (video signal) is saturated. Therefore, the brightest portion is excluded from the dynamic range of the camera under the conventional image pick-up condition and becomes white in the image thus obtained.

In addition, the conventional optimum condition is obtained after repeating pre-irradiation of X rays several times. Even though the amount of X rays irradiated one time is small, it becomes larger till main irradiation of X rays is finished, and this is not desirable.

SUMMARY OF THE INVENTION

An object of the present invention is to provide an X-ray diagnostic apparatus capable of correctly picking up bright portions of a patient image without excluding them from the dynamic range of an image pick-up camera.

This object of the present invention can be realized by an X-ray diagnostic apparatus comprising an X-ray source for irradiating a small dose of X rays to an object at the time of pre-irradiation and a larger dose at the time of main irradiation, a converter for converting an X-ray image of the object to an optical image, a pick-up camera for receiving the optical image from the converter through a diaphragm and converting it to a video signal, a detector for detecting the maximum value of the video signal from the pick-up camera at the time of pre-irradiation, and an arithmetic operation circuit for calculating from the maximum value detected and from image pick-up conditions except a diaphragm value at the time of main irradiation, such the diaphragm value at the time of main irradiation that the maximum value of an output video signal at the time of main irradiation equals a maximum value which the camera can output.

BRIEF DESCRIPTION OF THE DRAWINGS

FIG. 3 is a graph showing the characteristic of a television camera in the diagnostic apparatus shown in FIG. 1.

DETAILED DESCRIPTION OF THE PREFERRED EMBODIMENT

An embodiment of an X-ray diagnostic apparatus according to the present invention will be described with reference to the accompanying drawings.

Figure 1:
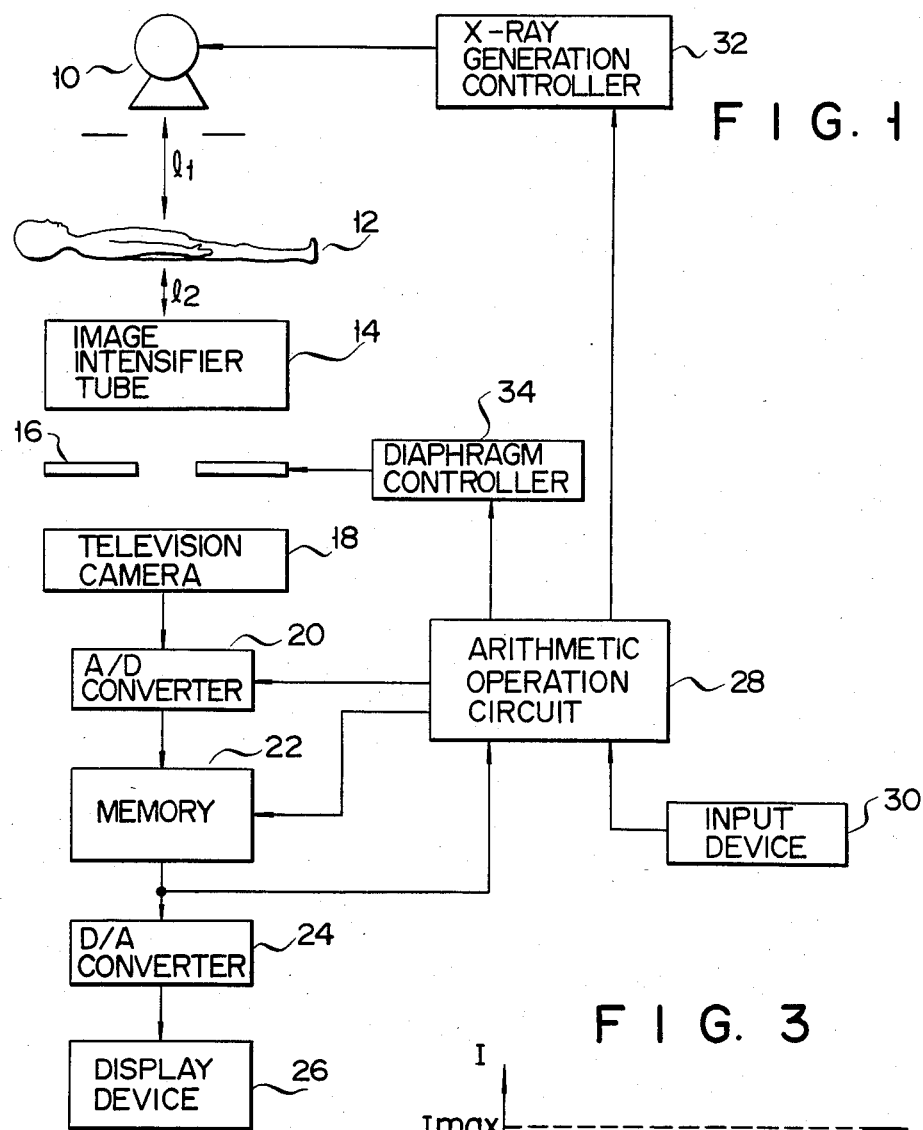
FIG. 1 is a block diagram showing an embodiment of an X-ray diagnostic apparatus according to the present invention.

FIG. 1 is a block diagram of the embodiment. Arranged in front of an object (patient) 12 is an X-ray tube 10 capable of adjusting the intensity of X rays irradiated. An X-ray image formed by irradiating X rays through the patient 12 is converted to an optical image by an image intensifier tube 14 arranged at the back of the patient 12. The optical image emitted from the image intensifier tube 14 enters into a television camera 18 through a diaphragm 16. The television camera 18 converts the incoming optical image to a video signal. The video signal continuously produced from the television camera 18 is converted into digital pixel data by the A/D converter 20. The pixel data are written into a memory 22. The pixel data read out from the memory 22 are supplied to a D/A converter 24 and to an arithmetic operation circuit 28. The pixel data are converted into the video signal by the D/A converter 24. The video signal is supplied to a display device 26. An input device 30 such as keyboard is connected to the arithmetic operation circuit 28. Results calculated by the arithmetic operation circuit 28 are supplied to an X-ray generation controller 32 and a diaphragm controller 34 to control X-ray intensity and diaphragm value on the basis of the calculated result.

Figure 2:
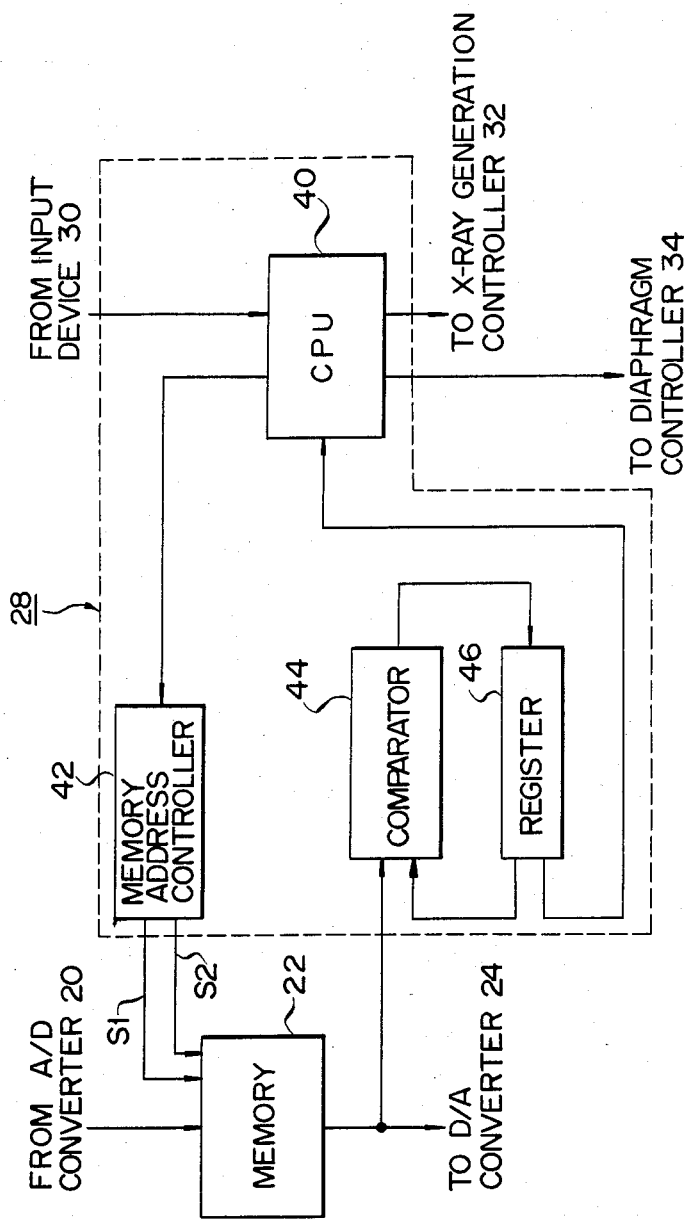
FIG. 2 is a circuit diagram showing in detail an arithmetic operation circuit in the diagnostic apparatus shown in FIG. 1.

The arithmetic operation circuit 28 will be described in detail referring to FIG. 2. Read-out start signal S1 and read-out address signal S2 are supplied to the memory 22 from a memory address controller 42 which is controlled by a CPU 40. The pixel data read out from the memory 22 is supplied to a comparator 44. Output data from a register 46 is also supplied to the comparator 44. The comparator 44 outputs the larger one of the two input data to store it in the register 46. If this comparison is carried out relating to all pixel data, the maximum pixel data in the memory 22 will be stored in the register 46. When this comparison is finished, the maximum pixel data in the register 46 is supplied to the CPU 40. Various image pick-up conditions are supplied from the input device 30 to the CPU 40, which calculates a diaphragm value at the time of main irradiation on the basis of these input conditions and the maximum pixel data in the register 46 to supply it to the diaphragm controller 34.

Operation of this embodiment will now be described. Although pre-irradiation of X rays is carried out before main irradiation even in the case of this embodiment, it is done only one time, differently from the conventional case. The patient 12 is appropriately positioned between the X-ray tube 10 and the image intensifier tube 14. Geometrical conditions (such as distance l1 between the X-ray source 10 and the patient 12, distance l2 between the patient 12 and the image intensifier tube 14 in FIG. 1 and aperture of the image intensifier tube 14) are supplied to the CPU 40, using the input device 30. Pre-irradiating conditions such as tube voltage, tube current and time of irradiation of the X-ray tube 10 and diaphragm value of the diaphragm 16 are then supplied to the CPU 40 through the input device 30. The dose of X rays irradiated at the time of pre-irradiation may be extremely small. The diaphragm value at the time of pre-irradiation is optional. The small dose of X rays is pre-irradiated from the X-ray tube 10 under this state. The television camera 18 converts the an X-ray image, which is formed by transmitting X rays through the patient 12 at this time of pre-irradiation, into a video signal, which is sampled and converted by the A/D converter 20 into digital pixel value. Each pixel data is written into a memory cell in the memory 22 corresponding to the pixel position.

When all the pixel data forming one frame are written into the memory 22, the memory 22 changes its mode to readout. This is started by supplying read-out start signal S1 from the CPU 40 to the memory 22 through the memory address controller 42. The pixel data are successively read out from the memory 22 responsive to read-out address signal S2 supplied from the address controller 42, and supplied to the comparator 44. The comparator 44 compares the read-out signal with the output signal from the register 46. The larger one of the two input signals to the comparator 44 is stored in the register 46. When all the pixel data forming one frame are read out, the data stored in the register 46 represents the intensity level of the pixel of maximum intensity.

Using this maximum intensity pixel data, the CPU 40 calculates an equivalent thickness t for water at the position of the pixel of the patient 12 where the maximum pixel data is generated, using as the basis of the determination the maximum pixel data, and the pre-established geometrical and pre-irradiation conditions (such as the diaphragm value).

The equivalent thickness t for water can be calculated based on the following equation.

$$I = \gamma \cdot \alpha \cdot G \cdot \overline{E} \int_{o}^{VP} \phi_o(E) \cdot C \cdot e^{-\mu(E) \cdot t} dE \quad (1)$$

where:

$\gamma$ ... conversion characteristic of the television camera 18

G ... gain of the optical system including the image intensifier tube 14

C ... X-ray decrement coefficient between the X-ray tube 10 and the image intensifier tube 14

$\mu(E)$ ... absorption coefficient of water $\phi_o\overline{E}$ ... number of photons on the body surface of the patient 12

I ... video signal from the television camera 18 corresponding to the object pixel $\alpha$ ... diaphragm value $\gamma$, G, C, are inherent in the X-ray image pick-up apparatus, $\mu(E)$ is a known physical coefficient, /, $\phi_o(E)$ are determined by the tube voltage and tube current, and I, $\alpha$ are coefficients to be detected.

the coefficients $\gamma$, G, C, $\mu(E)$ are stored, as numerical data, in a memory area (not shown) in the CPU 40. The coefficients /, $\phi_o(E)$ are calculated from the tube voltage and tube current input through the input device 30 based on a conversion table which is also stored in the memory area in the CPU 40. Therefore, all coefficients except the water equivalent thickness can be obtained if the tube voltage and tube current are input to the CPU 40 through the input device 30 and I and $\alpha$ are measured by suitable detectors and also input to the CPU 40. In this case, the value for tube current I is represented by the maximum pixel data which is supplied from the register 46 to the CPU 40. The water equivalent thickness t is obtained by reverse calculation using equation (1).

Geometrical and irradiating conditions at the time of main irradiation are input to the CPU 40 through the input device 30. The dose of X rays irradiated is larger the pre-irradiation dose. The television camera 18 has such a characteristic between intensity lx of the input optical image and output video signal I as shown in FIG. 3, and when the intensity lx increases to a certain value, the video signal I saturates. The known value for saturated signal value $I_{max}$ is input through the input device 30 to the CPU 40. It is necessary that the intensity value for the maximum pixel data produced during main irradiation be equal to $I_{max}$ in order to effectively use the intensity dynamic range of the television camera 18. The condition that the maximum pixel data equals $I_{max}$ corresponds to the optimum pick-up condition. At the time of main irradiation, an unknown parameter of the pick-up condition is the a diaphragm value. Using the main irradiation conditions, $I_{max}$, and the water equivalent thickness t calculated during pre-radiation, the CPU 40 calcualtes the diaphragm value $\alpha$ at the time of main irradiation based on equation (1).

That is, equation (1) is solved for water equivalent thickness t for the pixel producing the maximum pixel intensity at the time of pre-irradiation. /, $\phi_o(E)$ are then determined according to the main irradiation conditions. And the proper diaphragm value $\alpha$ is obtained using equation (1) and the pre-calculated value of t.

The arithmetic operation circuit 28 sets the diaphragm value of the diaphragm 16 to this calculated value through the diaphragm controller 34. Main irradiation is then carried out to apply a large dose of X rays to the patient 12. The X-ray image formed by main irradiation is picked up through the diaphragm 16 which has been set as described above, and written into the memory 22. Thereafter, the output data is D/A-converted to be displayed on the display device 26. As a result, the signal level of the brightest portion of the image does not exceed the saturated level $I_{max}$. The brightest portion of the image can be properly displayed without becoming white.

According to the embodiment as described above, there is provided an X-ray image pick-up apparatus capable of controlling the diaphragm in such a way that the video signal corresponding to the brightest portion of the optical image seen by the television camera at the time of main irradiation does not exceed the maximum value permissible to the camera or the upper limit of its dynamic range, whereby a correct image is displayed even if it contains a very bright portion. In addition, this diaphragm value is obtained not by pre-irradiating X rays through several cycles, but by arithmetic calculation based on a one time pre-irradiation, so that the dose of applied X rays is made small for patient safety. Further, the dose of X rays needed during pre-irradiation is minimized since the diaphragm value at that time is known.

It should be understood that the present invention is not limited to the above-described embodiment and that various modifications can be made to the present invention. An image intensifier tube may not necessarily be used but, for example, a simple fluorescent plate may be employed to convert the X-ray image to the optical image.

What is claimed is:

1. An X-ray diagnostic apparatus comprising:
   an X-ray source for transmitting first and second doses of X-rays through an object during first and second irradiation periods, respectively, said second dose being larger than said first dose;
   means for converting the X-ray images of said object produced during said irradiation periods to optical images;
   video means for receiving said optical images from the converting means through a light-transmitting diaphragm and converting the received optical images to video signals representing said optical images as a plurality of digital picture elements, said video signals reaching a fixed level of saturation when the intensity of said received optical image exceeds a certain value;
   means for detecting the maximum picture element value of the video signal produced by said video means during said first irradiation period;
   arithmetic operation means for calculating a value representing the light transmitting characteristic of said diaphragm for use during said second irradiation period, said arithmetic operation means functioning initially to calculate a permeability value by calculating the water equivalent thickness value t for the portion of said object corresponding to the picture element having the maximum intensity value, said permeability value representing the X-ray permeability of said object at an area corresponding to the picture element having the maximum picture element value detected during said first irradiation period, and thereafter functioning to calculate from the dosage parameters of the X-ray source during said second irradiation period and said permeability value, a diaphragm output value representing the light transmitting capacity of said diaphragm required to equate the intensity level of the maximum intensity picture element generated during said second irradiation period to the approximate saturation level of said video means; and
   means for setting the light emitting capacity of said diaphragm to said diaphragm output value during said second irradiation period, whereby the optical image transmitted by said diaphragm during said second period is matched to the dynamic range of said video means.

2. The X-ray diagnostic apparatus according to claim 1, wherein said arithmetic operating means calculates said water equivalent thickness value t based on the following equation:

$$I = \gamma \cdot a \cdot G \cdot \overline{E} \int_0^{VP} \phi_o(E) \cdot C \cdot e^{-\mu(E) \cdot t} dE$$

where:
$\gamma$ ... conversion characteristic of the video means
$G$ ... gain of the X-ray image/optical image converting means
$C$ ... X-ray decrement coefficient between the X-ray source and the X-ray image/optical image converting means
$\mu(E)$ ... adsorption coefficient of water
$\overline{E}$ ... average energy of X-ray photons
$\phi_o(E)$ ... number of photons on the surface of the object
$I$ ... video signal from the video means corresponding to the object pixel
$a$ ... diaphragm output value.

3. In an X-ray system having a diagnostic image generator for irradiating an object with X-rays to produce an optical image representing internal features of said object and video display means for receiving said optical image through an adjustable diaphragm and converting said image to an electronic image, the method comprising the steps of:
   irradiating said object with an initial dose of X-radiation to produce an initial electronic image;
   calculating, based on the parameters of said intitial X-radiation dose, an X-ray permeability value as a water equivalent thickness t for said object at an area corresponding to the picture element within said initial electronic image having the maximum image intensity;
   calculating, based on parameters established for a second predetermined dose of X-radiation, a value representing the light transmissivity of said diaphragm which is required to set the intensity level of said maximum intensity picture element at approximately the saturation level of said video display means;
   adjusting said diaphragm to transmit light in accordance with said calculated light transmissivity value; and
   irradiating said object with said second predetermined dose of X-radiation, whereupon the optical image transmitted by said diaphragm is matched to the dynamic range of said video display means.

4. The method set forth in claim 3 wherein said water equivalent thickness t is calculated based on the following equation:

$$I = \gamma \cdot a \cdot G \cdot \overline{E} \int_0^{VP} \phi_o(E) \cdot C \cdot e^{-\mu(E) \cdot t} dE$$

where:
$\gamma$ ... conversion characteristic of the video display means
$G$ ... gain of the image generator
$C$ ... X-ray decrement coefficient of the image generator
$\mu(E)$ ... absorption coefficient of water
$\overline{E}$ ... average energy of X-ray photons
$\phi_o(E)$ ... number of photons on the surface of the object
$I$ ... image intensity of picture element within electronic image
$a$ ... diaphragm light transmissivity value 5. The method set forth in claim 3 including the step of displaying on a TV monitor the electronic image generated by said video display means in response to said second dose of X-radiation.

* * * * *